US006405100B1

United States Patent
Christ (12) United States Patent
(10) Patent No.: US 6,405,100 B1
(45) Date of Patent: *Jun. 11, 2002

(54) PROCESS AND DEVICE FOR AUTOMATIC PROVISION OF PIECE-TYPE GOODS INTO OR ONTO INDIVIDUAL TRANSPORT UNITS

(76) Inventor: Ferdinand Christ, Johann-Sebastian-Bach-Ring 21, D-91575 Windsbach (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/142,836

(22) PCT Filed: Mar. 12, 1997

(86) PCT No.: PCT/EP97/01261
§ 371 (c)(1),
(2), (4) Date: Sep. 14, 1998

(87) PCT Pub. No.: WO97/34821
PCT Pub. Date: Sep. 25, 1997

(30) Foreign Application Priority Data

Mar. 18, 1996 (DE) .......................................... 196 10 594

(51) Int. Cl.[7] ............................................... G06F 7/00
(52) U.S. Cl. ..................... 700/216; 414/270; 53/501; 53/503; 53/504
(58) Field of Search ............................... 700/216, 213; 198/431, 464.3; 53/501, 503, 504; 414/268, 270, 807

(56) References Cited

U.S. PATENT DOCUMENTS

| | | | | |
|---|---|---|---|---|
| 2,694,350 A | * | 11/1954 | Malhiot | |
| 3,027,023 A | | 3/1962 | McGrath | 214/16 |
| 3,247,929 A | * | 4/1966 | Lanley et al. | 186/1 |
| 3,379,321 A | | 4/1968 | Weir | 214/16.4 |
| 3,443,357 A | * | 5/1969 | Bacon et al. | 53/186 |
| 3,746,130 A | * | 7/1973 | Bullas | 186/1 |
| 3,872,644 A | * | 3/1975 | Giraudi et al. | 53/52 |
| 4,189,273 A | | 2/1980 | Soderstrum et al. | 414/285 |

(List continued on next page.)

FOREIGN PATENT DOCUMENTS

| | | |
|---|---|---|
| DE | 1 781 400 A1 | 4/1971 |
| DE | 29 08 531 A1 | 10/1979 |
| DE | 3412025 A1 | 10/1985 |
| DE | 41 31 567 A1 | 3/1993 |
| EP | 0 183 074 B1 | 9/1989 |
| EP | 0 494 014 A1 | 7/1992 |
| EP | 0 516 970 A1 | 12/1992 |
| EP | 0 457 158 B1 | 1/1995 |

OTHER PUBLICATIONS

Methods of Goods Distribution and Order Filling in the United States, Heptner, "Fördern und heben", 19, 1969, No. 12, pp. 727–732 (with partial translation).

Possibilities to Automate Consignment–Assembly Systems, Fürwentsches, "Industrie–Anzeiger", May 11, 1973, Edition No. 40, pp. 824–826 (with partial translation).

*Primary Examiner*—Christopher P. Ellis
*Assistant Examiner*—Khoi H. Tran
(74) *Attorney, Agent, or Firm*—Browdy and Neimark, P.L.L.C.

(57) ABSTRACT

The invention concerns a method and device for the automatic loading of e.g. commissioned goods in the form of articles into or onto individual transport containers such as cardboard boxes or pallets. The goods, all or some of which may be commissioned, are conveyed to at least one predefined loading point past which the transport containers continuously move. The goods are placed in or on the appropriate transport container at the loading point. The supplying and loading of the goods and the movement of the transport containers are controlled in timely, i.e. synchronized, fashion by a control unit.

9 Claims, 5 Drawing Sheets

U.S. PATENT DOCUMENTS

| | | | |
|---|---|---|---|
| 4,364,217 A | | 12/1982 | Torrenteras et al. ............ 53/58 |
| 4,518,302 A | * | 5/1985 | Knapp ........................ 414/273 |
| 4,542,808 A | | 9/1985 | Lloyd, Jr. et al. ............. 186/56 |
| 5,230,206 A | | 7/1993 | Christ ........................ 53/501 |
| 5,238,122 A | | 8/1993 | Hart ........................... 209/555 |
| 5,241,806 A | * | 9/1993 | Zeigler et al. ................. 53/566 |
| 5,322,406 A | * | 6/1994 | Pippin et al. ............... 414/273 |
| 5,439,345 A | * | 8/1995 | Ivo ........................ 414/797.9 |
| 5,546,734 A | * | 8/1996 | Moncrief et al. ............. 53/534 |
| 5,687,553 A | * | 11/1997 | Malanowski ................. 53/504 |
| 5,733,098 A | * | 3/1998 | Lyon et al. ................. 414/786 |
| 5,875,434 A | * | 2/1999 | Matsuoka et al. ............ 705/28 |
| 5,943,841 A | * | 8/1999 | Wunscher .................... 53/154 |

\* cited by examiner

PROCESS AND DEVICE FOR AUTOMATIC PROVISION OF PIECE-TYPE GOODS INTO OR ONTO INDIVIDUAL TRANSPORT UNITS

FIELD OF THE INVENTION

The invention relates to a process and to a device for automatic provision of piece-type, optionally commissioned, goods into or onto individual transport units such as cartons, pallets or such like.

BACKGROUND OF THE INVENTION

Particularly in the mail-order business it is necessary to commission piece-type goods—ie, to assemble them according to number and type from a stock of an extremely wide range of goods in accordance with a specified order, to fill them into a dispatch carton and to dispatch them to the client. Fundamentally similar operations are to be observed when piece-type goods are deposited onto dispatch pallets or when they are mounted, such as by being suspended, onto transport units similar to clothes-rails. So long as goods of a single type are to be processed exclusively, the operations are relatively simple. However, as mentioned, goods of highly variable type and size have to be processed in the mail-order business. In accordance with the state of the art there have been attempts to automate, to a very large extent, the selection of the individual goods in question and the assembling thereof into a consignment corresponding to a specified order. Embodiments and examples of such processes and devices for commissioning individual articles are described, for example, in EP 0 457 158 B1, EP 0 183 074 A1, DE 34 12 025 A1, in the periodical "Industrie-Anzeiger" Volume 95, No. 40, May 11, 1973, Leinfelden-Echterdingen (DE), pp 824–826; W Fürdenschess: "Mooglichkeiten automatischer Kommissioniersysteme" and in the periodical "Fördern und Heben", Volume 19, 1969, Number 12, pp 727–731, K Heptner, "Methoden der Warenverteilung und Auftragszusammenstellung in den USA".

All these printed publications cited from the state of the art are concerned with the assembly of a consignment with as little effort as possible in terms of storage area and with an error-rate that is as low as possible. According to the state of the art the assembled consignment is passed in a heap onto an output conveyor and optionally introduced into an intermediate container. EP 0 457 158 B1 mentions in passing that, instead of an intermediate container, use may also be made of a dispatch carton, since the data pertaining to a consignment are known. However, the operations between assembly of a consignment and provision for final dispatch are not simply structured; on the contrary, errors may occur which not only block this area but can influence the entire plant, that is to say, also the assembly of the consignment. It is therefore desirable to automate the operations between assembly of a consignment and release to the dispatch department as far as possible and to take all necessary measures into account in the process. It is furthermore desirable to accelerate the speed of these operations as much as possible.

At the same time the needs of the mail-order business are to be taken into account. The assembled consignment is to be introduced into an appropriate container such as a dispatch carton or is to be placed onto an appropriate pallet or suspended on an appropriate transport unit such as an arrangement similar to a clothes-rail. After this packing operation a check is to be carried out, which conventionally is a visual check. Furthermore, dispatch documents are to be made available and added. Frequently a complementing operation is necessary, which ordinarily consists in adding filling or supporting material, free gifts and/or advertising leaflets. After a sealing step which may possibly be necessary, the dispatch addresses are applied and the data necessary for dispatch are ascertained and noted—for instance, weight, format or the like—in order also to be able to establish the costs of dispatch, whereby a distinction is to be made depending on whether the recipient or the sender has to bear the costs of dispatch, whether the recipient has to pay not only the costs of dispatch but also the total costs at the same time (for instance, in the case of a cash-on-delivery shipment) and such like.

SUMMARY OF THE INVENTION

It is therefore the object of the invention to design a process and a device of the type specified in the introduction in such a way that, with a very largely automated and rapid sequence of operations, there is no increased risk of error.

These and other objects, features, and advantages of the present invention are achieved by the process and the apparatus disclosed and described herein. Various modifications and alternative constructions are also disclosed that fall within the scope of the invention.

BRIEF DESCRIPTION OF THE DRAWINGS

The invention is elucidated in more detail below on the basis of several embodiment examples. Illustrated are.

DETAILED DESCRIPTION OF THE PREFERRED EMBODIMENTS

Figure 1:
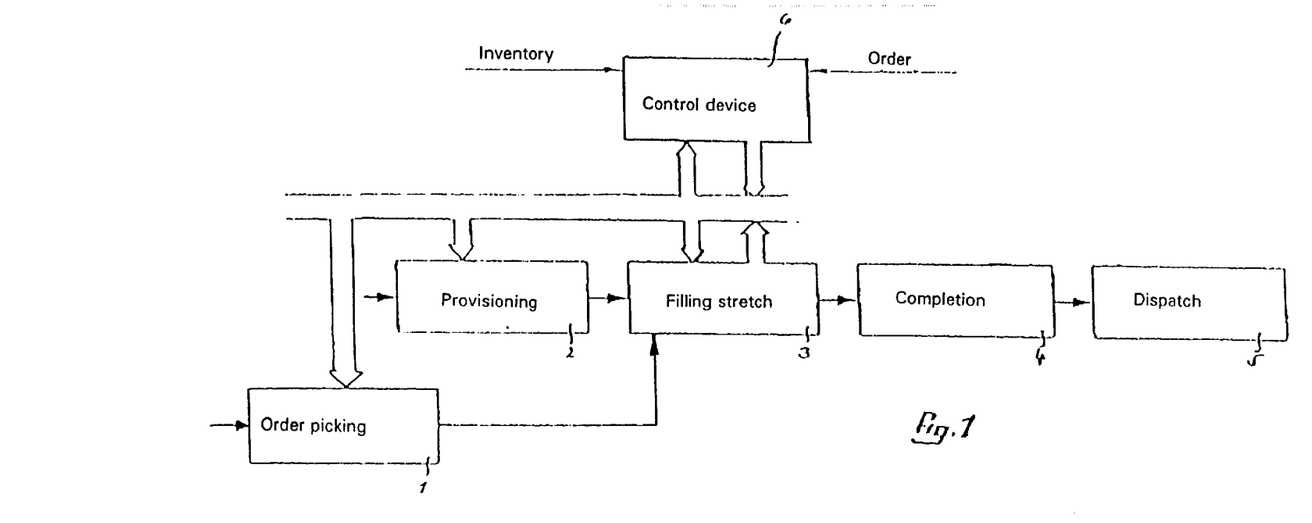
FIG. 1 schematically, the processing sequence under the control of a common control device, FIGS. 2–8 schematically, various practice-related embodiment examples.

FIG. 1 shows, to begin with, the basic sequence of the process according to the invention and therefore also the arrangement of associated devices in conformity with the system.

An order-picking step 1 designates a part of the plant or a process step in which piece-type goods are made available in the requisite number as desired by a customer. In practice, but not necessarily, it will also be a question of different goods, so that it is actually possible to speak of order picking. A provisioning step 2 designates a part of the plant or a process step in which the transport unit that is necessary in the given case is made available, for example is selected from a stock and prepared for the receipt of goods. These transport units may be dispatch cartons, dispatch containers, bags, pouches, but also pallets or such like, depending on the goods in question and also depending on the dispatch route that is appropriate in the given case. A filling stretch 3 designates a part of the plant or a process step in which the goods made available in the order-picking step 1 are filled, placed or mounted into or onto the transport unit supplied in the provisioning step 2. The filling stretch 3 may be followed by a conventional further processing step such as a completion step 4 in which completeness is checked, it being possible for this completion step 4 also to include an ascertainment of weight, the insertion of dispatch documents, complementing such as by means of free gifts, filling or supporting material and/or advertising leaflets. At the end of the completion step 4 the transport unit is optionally sealed. The sealed assembly consisting of goods and associated transport unit is subsequently supplied to a conventional dispatch step 5.

The synchronised control of the order-picking step 1, of the provisioning step 2 and of the filling stretch 3 is effected by a common control device 6 which not only emits commands to the individual devices performing these process steps but also receives status and acknowledgement messages and, over and above these, also messages concerning the orders to be executed and the sequence thereof and also messages concerning the individual components, goods and transport units supplied and removed, designated concisely in FIG. 1 by "inventory".

An essential element of the present invention is that an acceleration can be achieved by reason of the chosen sequence and the common control by the control device 6, inasmuch as that in the course of the transition from the order-picking step 1 to the filling stretch 3 the particular goods or consignments that have been assembled are dispensed directly into or onto the appropriate transport unit, in which connection the transport unit does not have to stop on the filling stretch 3 but is continuously conveyed there past the dispensing point for the goods supplied in the order-picking step. This avoids the risk of congestion and nevertheless ensures that all orders are executed accurately.

This will be explained in more detail on the basis of the various embodiments.

Figure 2:
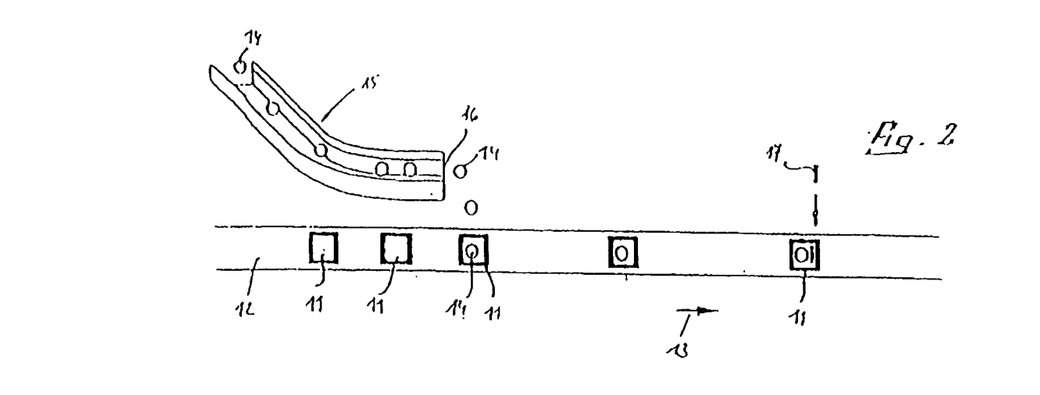

In the case of the embodiment according to FIG. 2, individual transport units represented by square frames, such as transport cartons 11, are transported continuously on a conveyor belt 12 (arrows 13). The goods 14, represented here by circles, are supplied in the order-picking step 1 (FIG. 1) to a stationary dispensing point 16 via a supply arrangement represented schematically as a chute 15 and are dispensed in the required quantity to the transport cartons 11 passing said dispensing point continuously. For this purpose a sluice, a shutter or such like (not represented in any detail) may be provided at the dispensing point 16 of the supply arrangement 15, the opening of said sluice or shutter being brought about by the control device 6 (FIG. 1), depending on whether a transport carton 11 is or is not present at the dispensing point 16, this being determined by means of a detector (not represented). Subsequently, as is conventional, a check is carried out (the devices required for this purpose are not represented in any detail) as to whether the item of merchandise 14 is actually present in the transport carton 11. In the affirmative case, dispatch documents 17 are added.

Figure 3:
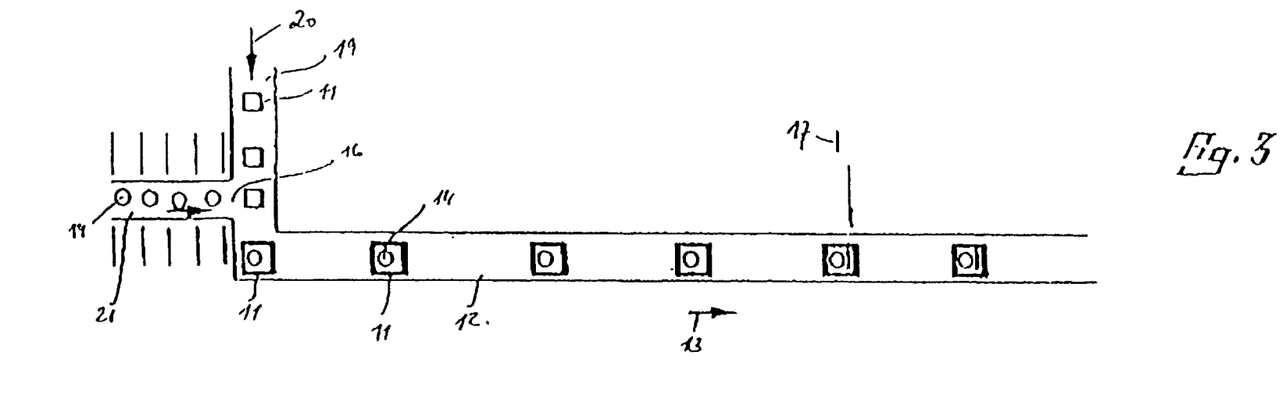

The embodiment example according to FIG. 3 differs from that according to FIG. 2 substantially by virtue of a different type of supply arrangement, so that, to a very large extent, use is made of the same reference symbols as in FIG. 2.

In the case of the embodiment example according to FIG. 3 the empty transport units, namely empty transport cartons 11 which are symbolised by smaller squares, are supplied via another conveyor belt 19 in accordance with the arrow 20, whereas the goods 14 are supplied via another conveyor 21. The goods 14 here may also be constituted by consignments. Goods 14 and transport carton 11 may accordingly be brought together by means of the conveyor belt 19 at a conveying speed of the empty transport cartons 11 differing from the other, conventional processing on the conveyor belt 12. By this means a buffering can be achieved.

Figure 4:
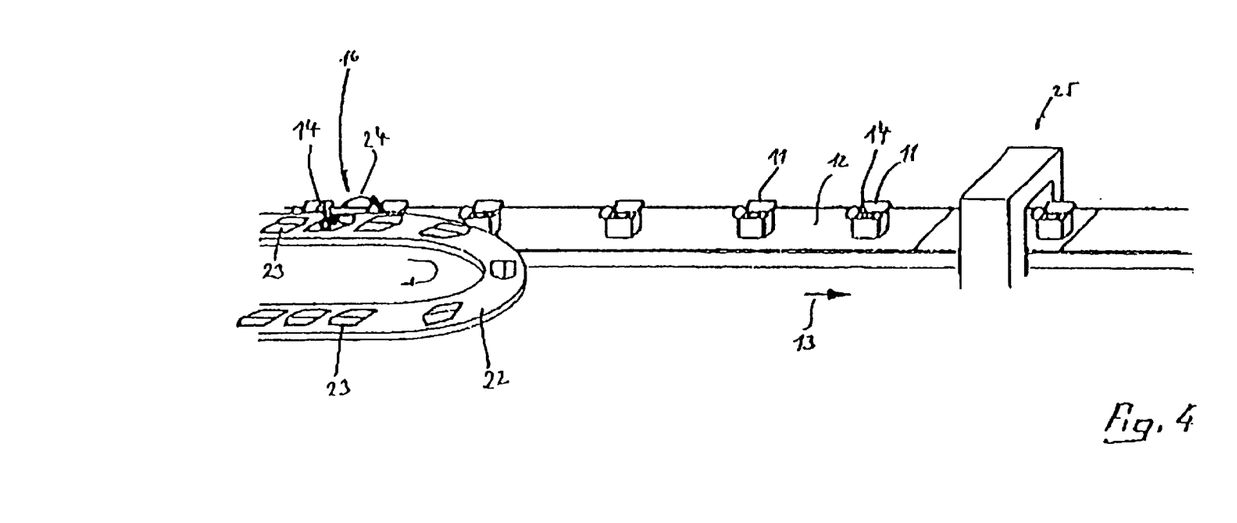

The embodiment example according to FIG. 4 likewise makes reference to the embodiment examples according to FIGS. 2 and 3 and differs, on the one hand, by virtue of a somewhat more concrete representation and also by virtue of a different supply arrangement for the order-picking step 1, so that, here too, use has very largely been made of the same reference symbols.

The goods 14 here are brought round on a circulating conveyor 22, having been applied, also for example in the form of a consignment, onto this circulating conveyor 22 at another point. During a certain section of its path the circulating conveyor 22 runs parallel to and substantially at a similar speed as the conveyor belt 12 on which the initially empty transport cartons 11 are located. The circulating conveyor 22 contains tipping mechanisms 23 on which the goods 14 in question are located. In the aforementioned section of synchronism the tipping mechanism 23 is actuated, controlled by the control device 6 (FIG. 1), as a result of which said tipping mechanism tips the goods 14 into the initially empty transport carton 11, which is situated roughly at the same height, in accordance with the path of movement symbolised by the arrow 24.

In a station 25 which is represented schematically by a type of bridge a conventional weighing of the carton 11 that is provided with goods 14 is carried out. This weighing in the station 25 may already suffice to achieve the check within the completion step 4 according to FIG. 1 as to whether all or the correct goods 14 have been inserted into the associated transport carton 11, since the weights of each item of merchandise 14 are known very precisely, and it can accordingly also trigger the supply of associated dispatch documents (not represented here).

With regard to the weighing station 25 it is also to be noted that it is known as such to be able to weigh goods conveyed on a conveying belt 12 without removing them from the conveyor belt. Of course, use may also be made of weighing stations 25 that are independent of the conveying belt 12 and that, after the weighing operation, pass the goods on to an additional conveying belt (not represented in detail).

Figure 5:
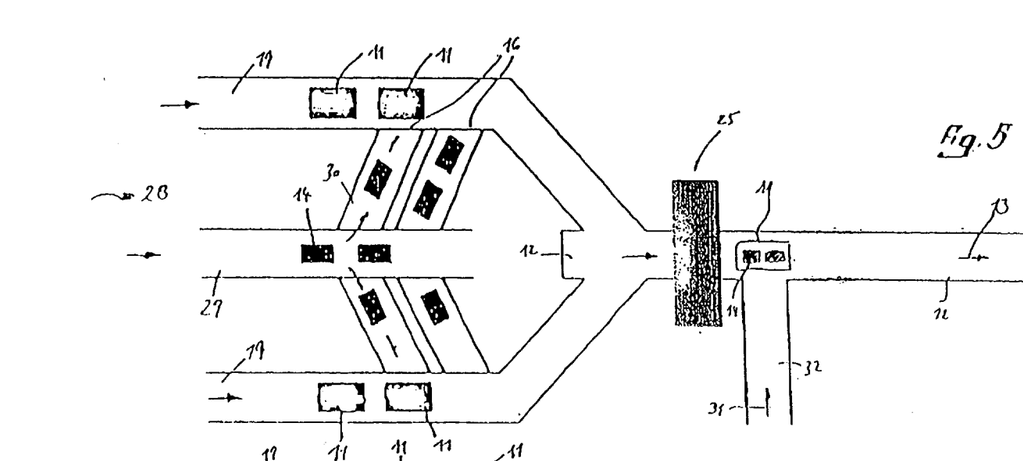

The embodiment example according to FIG. 5 differs substantially from the embodiment example according to FIG. 4 by virtue of the different type of supply arrangement. In the case of the supply arrangement 28 represented in FIG. 5 it is a question, for example, of an automated order-picking machine such as is elucidated in detail in EP 0 457 158 B1. Accordingly, individual goods 14, which may be of extraordinarily different type, are supplied via a supply conveyor 29 and, controlled by a computer, distributed onto various inclined conveyors 30 in preferred orientation. Via these inclined conveyors 30 the individual goods are distributed onto the empty transport cartons 11 supplied via conveyor belts 19 in accordance with the specification of the consignment in question, synchronously with the latter and controlled by the control device 6 (FIG. 1). The transport cartons 11 provided with the individual goods 14 assembled in accordance with a special consignment then reach a common conveyor belt 12 and via the latter reach the weighing station 25, as is conventional. Prior to sealing, a conventional complementing step known as such may be carried out, the complementing materials being supplied in accordance with the arrow 31, for example via a chute or another conveyor 32, to an already weighed or checked carton 11 filled with goods 14. As already mentioned, the complementing materials may comprise filling or supporting material but may also comprise free gifts and advertising leaflets.

Figure 6:
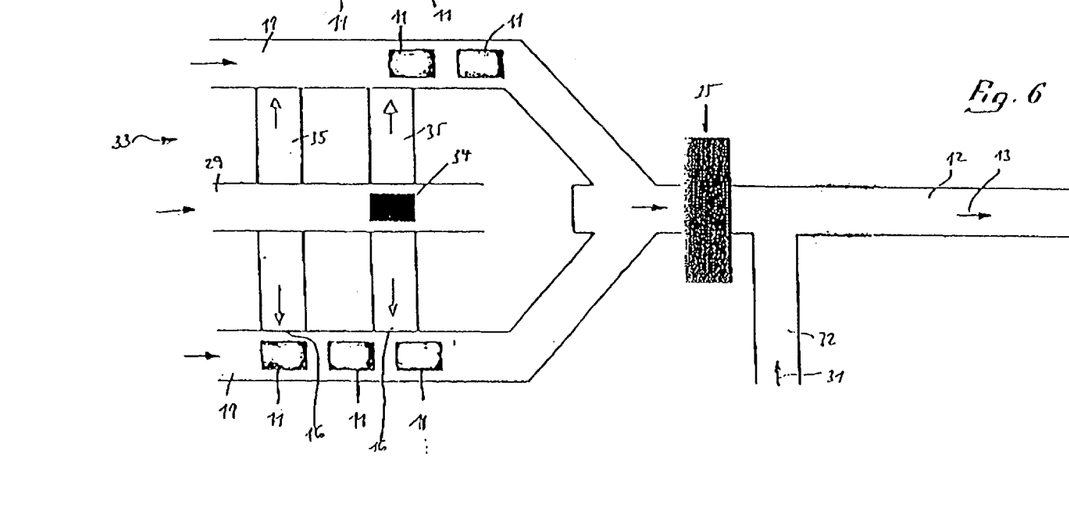

The embodiment example according to FIG. 6 differs from that according to FIG. 5 by virtue of a different configuration of the supply arrangement. The supply arrangement 33 therein is designed in such a way that intermediate containers 34 are supplied via the conveyor 29, in which connection the intermediate containers 34 contain the goods 14, the consignments or only parts thereof. At suitable points these intermediate containers 34 are emptied, the appropriate goods then being supplied via chutes 35 to the empty transport cartons 11 supplied via the conveyor belt 19, optionally at several points along the conveyor belt 19.

Further handling is effected as in the embodiment example according to FIG. 5.

Figure 7:
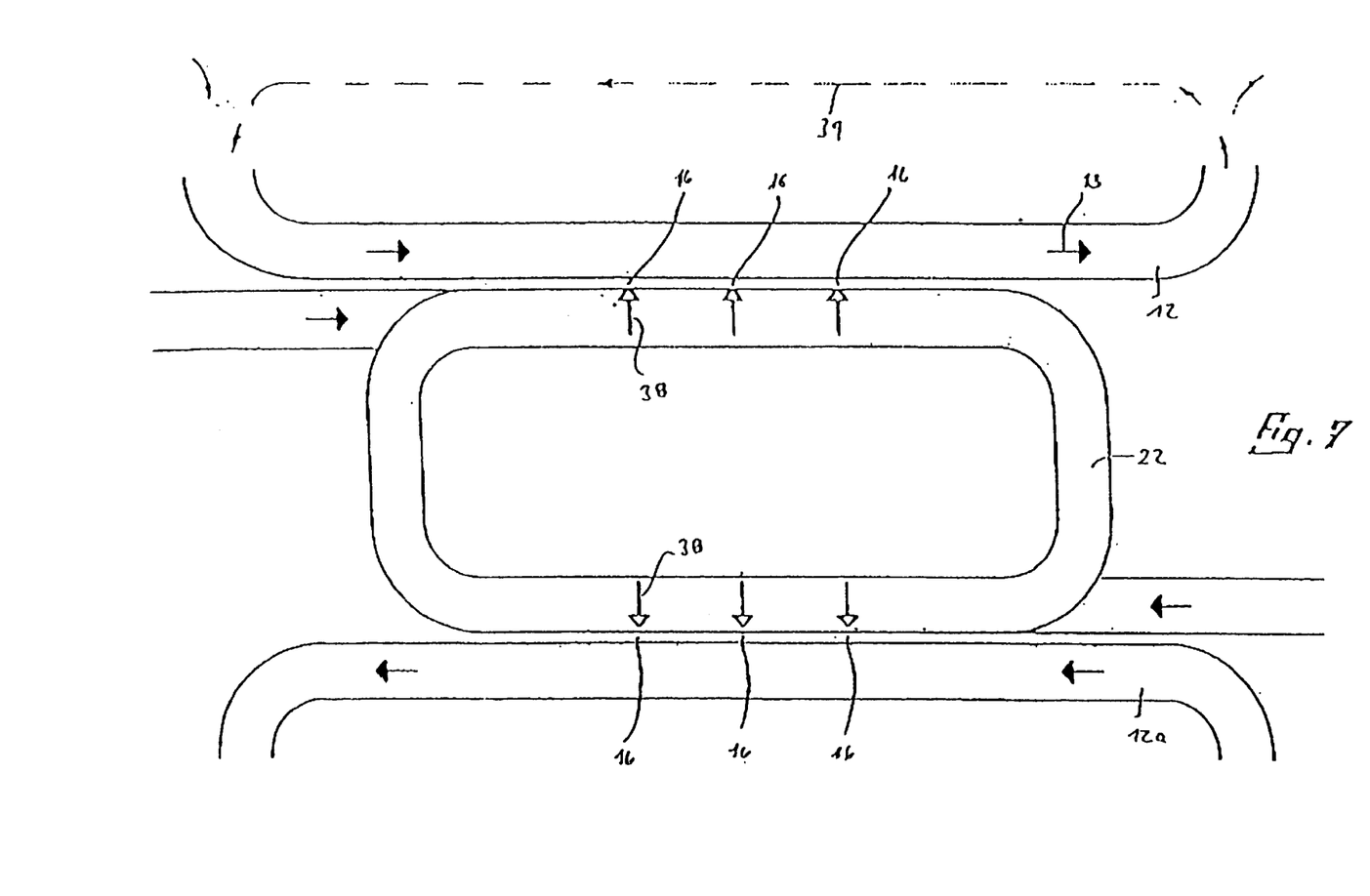

The embodiment example according to FIG. 7 follows the model of that according to FIG. 4 to the extent that a circulating conveyor 22 is provided. Goods 14 or assembled consignments or partial consignments are supplied to the circulating conveyor 22 via several supply conveyors 36 and 37. Parallel conveyor belts 12 and 12a run past the circulating conveyor 22, on which, as already explained with reference to FIG. 4, transport cartons 11 are located, into which the goods 14 are surrendered at suitable points, individually or in the form of consignments or partial consignments. This is symbolised by arrows 38 and may be carried out by, for instance, tipping mechanisms, as explained with reference to FIG. 4. The embodiment according to FIG. 7 permits several transport cartons 11 to be filled simultaneously with different goods 14 and/or a transport carton 11 to be filled at several points in succession.

FIG. 7 also shows another option schematically. A transport carton 11 which as yet is not completely filled can be moved past the circulating conveyor 22 again via a feedback loop 39.

As mentioned, an item of merchandise can be inserted into the same transport carton 11 at different points in succession. This is of significance when a consignment comprises goods that differ greatly from one another and/or when it is expedient or necessary to arrange certain goods underneath other goods. By way of example, a consignment will be imagined that consists of a large-format heavy book, packaged shirts or blouses and also other small components, possibly even components that are susceptible to breakage. It is then necessary to place the book, optionally even in a precisely predetermined location, into a transport carton 11 first, to deposit the packaged shirt or packaged blouse thereupon and subsequently to charge the remaining components. The sequence of the introduction of certain goods and partial consignments into a certain transport carton 11 can be controlled automatically and in synchronised manner by the control device 6 (FIG. 1).

Figure 8:
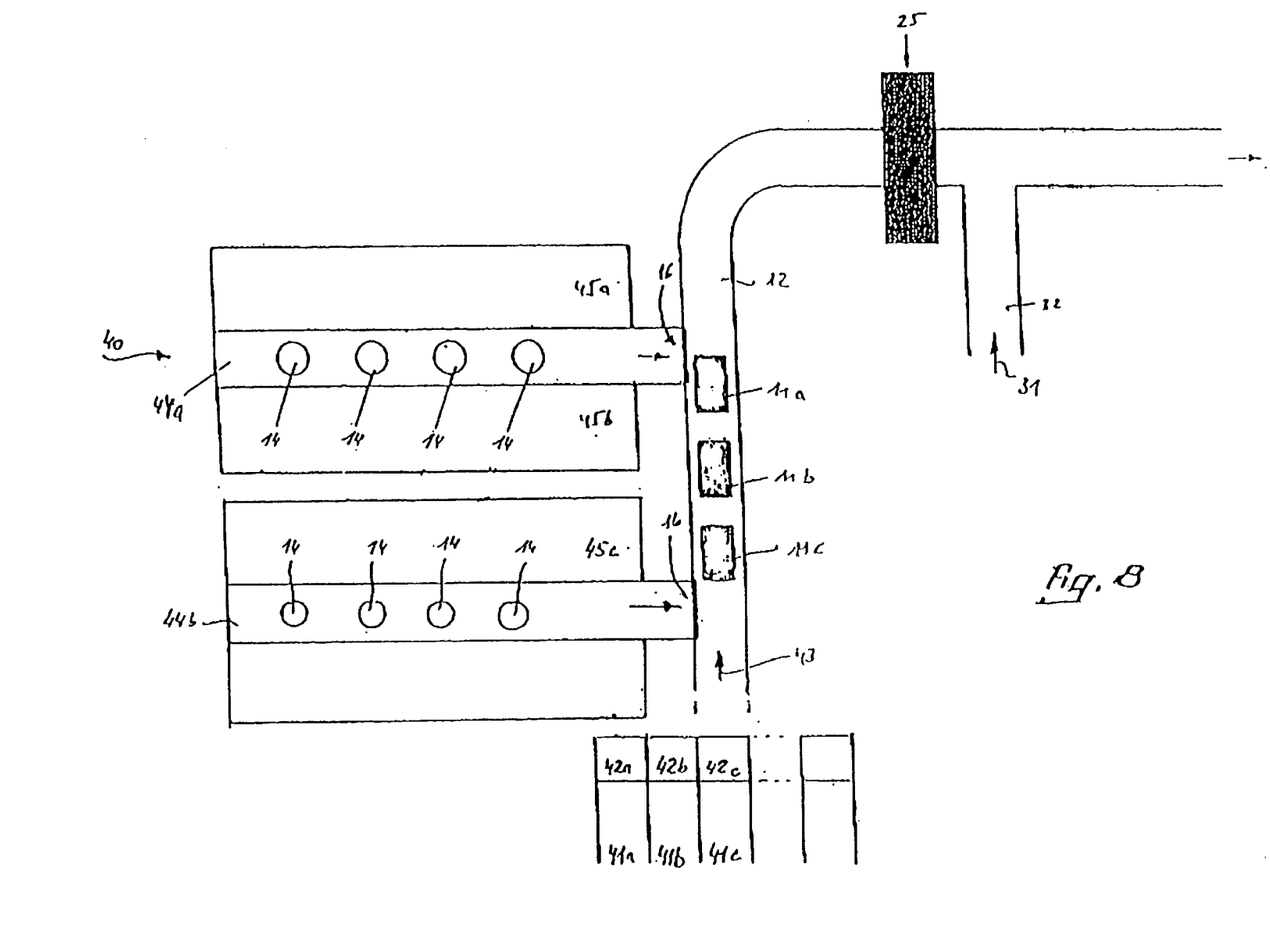

The embodiment according to FIG. 8 is also based on the schematic representations of the previous embodiment examples. In FIG. 8 it is shown that transport cartons 11a, 11b, 11c, . . . , which may have extremely different dimensions, are conducted successively on the conveyor belt 12 past dispensing points 16 of a supply arrangement 40. The individual transport cartons are drawn from a stock and erected automatically in associated erecting machines. In this connection a specific stock and a specific erecting machine is assigned to each transport-carton format. For instance, a stock 41a and a carton-erecting machine 42a are assigned to the transport carton 11a, a stock 41b and a carton-erecting machine 42b are assigned to the transport carton 11b, etc, with the carton 11a, 11b, 11c, . . . that is necessary in the given case being placed, controlled automatically by the control device 6 (FIG. 1), onto the conveyor belt 12 in the sequence according to the arrow 43, which is likewise controlled by the control device 6 on the basis of certain orders and, to be specific, also subject to a given spacing. At the at least one dispensing point 16 the goods 14 in question are then dispensed into the appropriate carton 11a, 11b, 11c, . . . , likewise controlled automatically by the control device 6. The goods can be supplied separately or jointly via appropriate automated order-picking machines 45a, 45b, 45c, . . . to conveyors 44a, 44b pertaining to the supply arrangement 40 which lead to dispensing points 16. Filling of the cartons 11a, 11b, 11c, . . . is then continued further in the manner already explained in detail.

Alternatively the complementing materials may also be supplied upstream of the weighing station 25, particularly if they have an appreciable weight and the total weight necessarily has to be ascertained for dispatch purposes. Furthermore, in those cases where the station is unable to process all available formats of transport cartons 11 it is possible to provide a switch and to process them further in various appropriate stations. Of course, these steps may be carried out by hand, as is likewise known as such and traditionally conventional.

The invention was elucidated above on the basis of embodiments in which goods 14 are filled into transport cartons 11 by way of transport units. In principle, the same operations are possible and feasible when goods are filled into dispatch containers, into bags, pouches or such like and also when goods are placed onto pallets, in which connection it may be expedient or even necessary under certain circumstances to relocate and to deposit individual goods at the appropriate dispensing point. Similar remarks apply to other types of transport unit, for instance to units that are similar to clothes-rails. The appropriate goods are then grasped and unhitched there by means of appropriately formed gripping units. Furthermore it should be pointed out that, even though chutes and tipping mechanisms were mentioned above, the item(s) of merchandise 14 may also be dispensed into or onto the transport units in a different manner, for instance by the force of gravity or by means of a suitable apparatus operating mechanically, from top to bottom, with or without inclination (for example, from top right to below at the rear or such like), etc. Depending on the type of goods, stacking or a different special operation optionally enters into consideration.

The essential point is that the transport units, for instance the transport cartons 11, are continuously conducted past the at least one dispensing point 16, in which connection the goods 14, a whole consignment or merely a partial consignment is available at this time—ie, synchronously—at the appropriate dispensing point 16. It is furthermore essential that the supply to the dispensing point 16, the conveying-past of the transport unit, such as the transport carton 11, and the dispensing of the goods 14 available to the transport unit, such as the transport carton 11, at the dispensing point 16 are controlled by a common control device 6. By this means the packaging step which is essential in the mail-order business can not only be automated to a very large extent but can also be adapted in its progress to the mode of operation, and above all the speed, of the order-picking apparatus. Furthermore, great flexibility is possible, so that combinations of transport units and goods that, in particular, fluctuate considerably but are also constant over relatively long time-intervals are possible in reliable manner and at high speed.

What is claimed is:

1. Process for automatically providing piece-type goods into or onto individual transport units for mail-order business comprising the following steps:

automatically conveying the goods on a conveyor to at least one spatially specified dispensing point;

passing the goods to be made available from the conveyor by an order-picker;

continuously conducting the transport units past the order picker and past the dispensing point;

selecting a transport unit corresponding to each individual good according to at least one of type, number, size from an appropriate stock of transport units of varying size and/or varying type; and dispensing the goods at the dispensing point into or onto the appropriate continuously conveyed transport unit, the dispensing, conveying, passing, selecting, and conducting steps being controlled and synchronized by a common control device.

2. Process according to claim 1, comprising the step of automatically setting the transport unit into a receiving state prior to supplying the transport unit to a dispensing point.

3. Process according to claim 2, wherein the transport unit is a carton and the process comprises the step of automatically erecting the carton from a folded state.

4. Process according to claim 1, comprising the step of passing the goods into or onto the transport units past by means of at least one automated order-picking machine which assembles the goods automatically in accordance with incoming orders.

5. Process according to claim 1, comprising the step of preparing and conducting the selected transport unit past the at least one dispensing point at an appropriate time.

6. Process according to claim 1, comprising the step of supplying an appropriate transport unit to different dispensing points in succession at an appropriate time controlled by the control device and in such a way that altogether only all the goods of a particular order are supplied to this transport unit.

7. Device for automatically providing piece-type goods into or onto individual transport units, the device comprising:

a device for conveying the goods acting to convey the goods to at least one spatially specified dispensing point at which a dispensing function is performed;

a device for continuously conducting the transport units past the dispensing point;

a control device for controlling the device for conveying the goods, the dispensing function at the dispensing point, and the device for conducting the transport units past the dispensing point, the control device also function to select an appropriate transport unit from a stock of transport units of various sizes and/or various types corresponding to at least one of type, number, and size of the goods and to conduct the selected transport unit at an appropriate time past the dispensing point for these goods; and at least one automated order-picking machine for assembling goods in accordance with incoming orders and dispensing the assembled goods into or onto the device for conveying the goods.

8. Device according to claim 7, comprising a device for automatically bringing a transport unit into a receiving state prior to conducting the transport unit past the dispensing point.

9. Device according to claim 8, wherein the transport unit is a carton and the process comprises the step of automatically erecting the carton from a folded state.

* * * * *